United States Patent
Zhou et al.

(10) Patent No.: US 12,307,408 B2
(45) Date of Patent: May 20, 2025

(54) METHOD AND APPARATUS FOR POSITIONING EXPRESS PARCEL

(71) Applicants: Beijing Wodong Tianjun Information Technology Co., Ltd., Beijing (CN); Beijing Jingdong Century Trading Co., Ltd., Beijing (CN)

(72) Inventors: Peng Zhou, Beijing (CN); Yuntao Wang, Beijing (CN); Mo Zhou, Beijing (CN)

(73) Assignees: Beijing Wodong Tianjun Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 447 days.

(21) Appl. No.: 17/914,216

(22) PCT Filed: Jan. 22, 2021

(86) PCT No.: PCT/CN2021/073321
§ 371 (c)(1),
(2) Date: Sep. 23, 2022

(87) PCT Pub. No.: WO2021/196836
PCT Pub. Date: Oct. 7, 2021

(65) Prior Publication Data
US 2023/0123879 A1    Apr. 20, 2023

(30) Foreign Application Priority Data
Mar. 30, 2020   (CN) .......................... 202010239330.1

(51) Int. Cl.
*G06Q 10/0833*   (2023.01)
*G06T 7/73*   (2017.01)
*G06V 30/424*   (2022.01)

(52) U.S. Cl.
CPC .......... *G06Q 10/0833* (2013.01); *G06T 7/75* (2017.01); *G06T 2207/10004* (2013.01); *G06V 30/424* (2022.01)

(58) Field of Classification Search
None
See application file for complete search history.

(56) References Cited

U.S. PATENT DOCUMENTS 10,854,055 B1 *   12/2020   Cornell ................ G08B 29/186
11,163,968 B1 *   11/2021   Boguszewski ....... G06K 7/1447
(Continued)

FOREIGN PATENT DOCUMENTS

CN   104951915 A   9/2015
CN   106355174 A   1/2017
(Continued)

OTHER PUBLICATIONS

International Search Report and Written Opinion for PCT/CN2021/092931, dated Jul. 30, 2021, 4 pgs.
(Continued)

*Primary Examiner* — S J Park
*Assistant Examiner* — Caroline E. Depalma
(74) *Attorney, Agent, or Firm* — Blank Rome LLP

(57) ABSTRACT

A method and apparatus for locating an express package. The method includes: receiving an express locating request, where the express locating request is used to locate an express waybill corresponding to a target express package from an express image presenting express packages, and the express locating request includes express information; searching for pre-stored location information of the express waybill corresponding to the express information; generating an express locating result image by means of the location information, where the express locating result image includes a locating identifier, and the locating identifier is (Continued)

used to indicate the express waybill corresponding to the target express package from the express image; and outputting the express locating result image.

18 Claims, 6 Drawing Sheets

(56) References Cited

U.S. PATENT DOCUMENTS

| | | | |
|---|---|---|---|
| 2007/0138285 | A1 | 6/2007 | Auslander et al. |
| 2019/0043004 | A1* | 2/2019 | Lesieur ............. G02B 27/0176 |
| 2020/0018603 | A1 | 1/2020 | Deng et al. |

FOREIGN PATENT DOCUMENTS

| | | | |
|---|---|---|---|
| CN | 107341523 | A | 11/2017 |
| CN | 107368983 | A | 11/2017 |
| CN | 107622247 | A | 1/2018 |
| CN | 207622247 | A | 1/2018 |
| CN | 108696594 | A | 10/2018 |
| CN | 109271935 | A | 1/2019 |
| CN | 110102490 | A | 8/2019 |
| CN | 110210488 | A | 9/2019 |
| CN | 110263047 | A | 9/2019 |
| CN | 110309796 | A | 10/2019 |
| CN | 110443551 | A | 11/2019 |
| CN | 110446082 | A | 11/2019 |
| CN | 110705486 | A | 1/2020 |
| CN | 10844508 | A | 2/2020 |
| CN | 111866085 | A | 10/2020 |
| KR | 10-2018-0009330 | A | 1/2018 |
| KR | 10-2019-0101929 | A | 9/2019 |
| WO | 2013137789 | A1 | 9/2013 |
| WO | WO-2014177751 | A1 * | 11/2014 ......... G06K 9/00771 |

OTHER PUBLICATIONS

Liu et al., Location and Processing the Handwriting Information Region of Scanned Express Form Images, Computer Knowledge and Technology, vol. 8, No. 32, Nov. 2012, 3 pages.

* cited by examiner

METHOD AND APPARATUS FOR POSITIONING EXPRESS PARCEL

This patent application is a National Stage of Application No. PCT/CN2021/073321, filed on Jan. 22, 2021, which claims the priority of Chinese Patent Application No. 202010239330.1, filed on Mar. 30, 2020 by Beijing Wodong Tianjun Information Technology Co., Ltd. and Beijing Jingdong Century Trading Co., Ltd., and entitled "Method and Apparatus for Locating Express Package", the entire contents of which is are herein incorporated by reference.

TECHNICAL FIELD

Embodiments of this disclosure relate to the technical field of computers, and in particular, to a method and apparatus for locating an express package.

BACKGROUND

With the continuous development of society, express packages have been applied more and more widely. Customers' online shopping, delivery of documents or goods between companies, and articles posted between persons are all carried out in the form of express packages by logistics companies.

SUMMARY

Embodiments of the present disclosure provide a method and apparatus for locating an express package.

In a first aspect, an embodiment of the present disclosure provides a method for locating an express package. The method includes: receiving an express locating request, where the express locating request is used to locate an express waybill corresponding to a target express package from an express image presenting express packages, and the express locating request includes express information; searching for pre-stored location information of the express waybill corresponding to the express information; generating an express locating result image by means of the location information, where the express locating result image includes a locating identifier, and the locating identifier is used to indicate the express waybill corresponding to the target express package from the express image; and outputting the express locating result image.

In some embodiments, before receiving the express locating request, the method includes: acquiring the express image presenting express packages; determining, based on the express image and a pre-trained express identification model, location information of each express waybill in at least one express waybill identified from the express image and express information on each express waybill; and associatively storing the location information of each express waybill in the at least one express waybill with the corresponding express information.

In some embodiments, the express image includes a regional express image, and the express identification model includes an express detection model, an express location identification model, and an express information identification model. Determining, based on the express image and the pre-trained express identification model, location information of each express waybill in at least one express waybill identified from the express image and express information on each express waybill includes: determining an express waybill region in the regional express image based on the regional express image and the express detection model; inputting the express waybill region into the express location identification model, to obtain the location information of each express waybill in the at least one express waybill; and inputting the express waybill region into the express information identification model, to obtain the express information on each express waybill in the at least one express waybill.

In some embodiments, the express detection model includes an express waybill detection model and an express package detection model. Determining the express waybill region in the regional express image based on the regional express image and the express detection model includes: inputting the regional express image into the express waybill detection model, to obtain at least one initial express waybill region detected from the regional express image and a predicted probability corresponding to each initial express waybill region in the at least one initial express waybill region; inputting the regional express image into the express package detection model, to obtain at least one express package region detected from the regional express image and a predicted probability corresponding to each express package region in the at least one express package region; and determining the express waybill region in the regional express image based on the at least one initial express waybill region, the predicted probability corresponding to each initial express waybill region in the at least one initial express waybill region, the at least one express package region, and the predicted probability corresponding to each express package region in the at least one express package region.

In some embodiments, the express image includes a panoramic express image, and the express identification model further includes a panoramic identification model. Determining, based on the express image and the pre-trained express identification model, location information of each express waybill in at least one express waybill identified from the express image and express information on each express waybill includes: inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

In a second aspect, an embodiment of the present disclosure provides an apparatus for locating an express package. The apparatus includes: a receiving unit, configured to receive an express locating request, where the express locating request is used to locate an express waybill corresponding to a target express package from an express image presenting express packages, and the express locating request includes express information; a search unit, configured to search for pre-stored location information of the express waybill corresponding to the express information; a generating unit, configured to generate an express locating result image by means of the location information, where the express locating result image includes a locating identifier, and the locating identifier is used to indicate the express waybill corresponding to the target express package from the express image; and an output unit, configured to output the express locating result image.

In a third aspect, an embodiment of the present disclosure provides an electronic device. The electronic device includes one or more processors; and a storage apparatus, storing one or more programs. The one or more programs, when executed by the one or more processors, cause the one or more processors to implement the method according to any implementation in the first aspect.

In a fourth aspect, an embodiment of the present disclosure provides a computer-readable medium storing a computer program. When the program is executed by a processor, the method according to any implementation in the first aspect is implemented.

According to the method and apparatus for locating an express package, provided by the above embodiments of the present disclosure, an express locating request is received; then, pre-stored location information of an express waybill corresponding to express information included in the express locating request is searched; next, an express locating result image including an express waybill for indicating a target express package from an express image is generated by using the location information; and finally, the express locating result image is output. In this way, the locating efficiency of express packages is improved, thereby improving the efficiency of express delivery.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
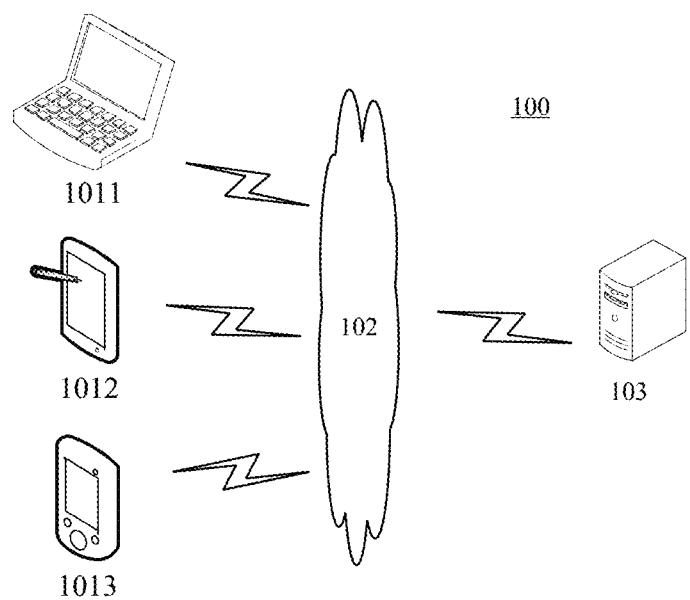
FIG. 1 is an example system architecture diagram to which various embodiments of the present disclosure may be applied.

FIG. 1 illustrates an example system architecture 100 to which embodiments of a method for locating an express package according to the present disclosure may be applied.

As shown in FIG. 1, the system architecture 100 may include terminal devices 1011, 1012 and 1013, a network 102, and a server 103. The network 102 serves as a medium providing a communication link between the terminal devices 1011, 1012 and 1013 and the server 103. The network 102 may include various types of connections, such as wired or wireless communication links, or optical fiber cables.

A courier may use the terminal device 1011, 1012 or 1013 to interact with the server 103 through the network 102 to send or receive a message, etc. (for example, the server 103 may receive an express locating request sent by the terminal device 1011, 1012 or 1013, and the terminal device 1011, 1012 or 1013 may also receive an express locating result image sent by the server 103). Various communication client applications, such as image processing applications, express management applications and instant messaging software, may be installed on the terminal device 1011, 1012 or 1013.

The terminal device 1011, 1012 or 1013 may first receive an express locating request; then search for pre-stored location information of an express waybill corresponding to express information included in the express locating request; next, generate an express locating result image by means of the location information, the express locating result image including a locating identifier for indicating an express waybill corresponding to a target express package from the express image; and finally, output the express locating result image.

The terminal devices 1011, 1012 and 1013 may be hardware or software. When the terminal devices 1011, 1012 and 1013 are hardware, they may be various electronic devices supporting information interaction, including but not limited to a smart phone, a tablet computer, a laptop portable computer, a desktop computer, etc. When the terminal devices 1011, 1012 and 1013 are software, they may be installed in the above-listed electronic devices, and may be implemented as a plurality of software programs or software modules, or as a single software program or software module, which will not be limited herein.

The server 103 may provide various services, For example, the server 103 may be a background server that analyzes the express locating request. The server 103 may first receive the express locating request from the terminal devices 1011, 1012 and 1013; then, search for pre-stored location information of an express waybill corresponding to express information included in the express locating request; next, generate an express locating result image by means of the location information, the express locating result image including a locating identifier for indicating an express waybill corresponding to a target express package from the express image; and finally, output the express locating result image, for example, send the express locating result image to the terminal devices 1011, 1012 and 1013.

It should be noted that the server 103 may be hardware or software. When the server 103 is hardware, the server 105 may be implemented as a distributed server cluster composed of multiple servers, or as a single server. When the server 103 is software, the server 103 may be implemented as a plurality of software programs or software modules (e.g., for providing distributed services), or as a single software program or software module. Specific limitations are not provided here.

It should be noted that the method for locating an express package, provided by the embodiments of the present disclosure, may be performed by the server 103, or may be performed by the terminal devices 1011, 1012 and 1013.

It should be noted that the terminal devices 1011, 1012 and 1013 may locally store a corresponding relationship between location information of an express waybill and corresponding express information, and the terminal devices 1011, 1012 and 1013 may locally search for the location information of the express waybill corresponding to the express information. The server 103 and the network 102 may be absent from the example system architecture 100 at this time.

It should be understood that the numbers of the terminal devices, the network and the server in FIG. 1 are merely illustrative. Any number of terminal devices, networks and servers may be provided based on actual requirements.

Figure 2:
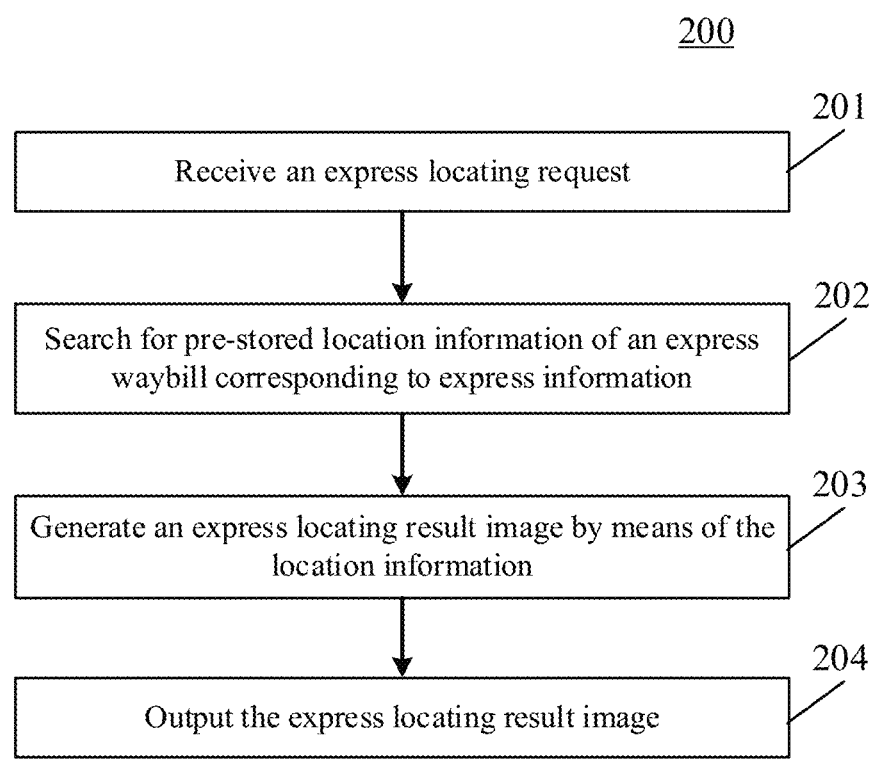
FIG. 2 is a flowchart of a method for locating an express package according to an embodiment of the present disclosure.

With continued reference to FIG. 2, a flow 200 of a method for locating an express package according to an embodiment of the present disclosure is shown. The method for locating an express package includes the following steps.

Step 201: Receiving an express locating request.

In this embodiment, the executing body (for example, the server or the terminal device shown in FIG. 1) of the method for locating an express package may receive the express locating request. The express locating request is generally used to locate an express waybill corresponding to a target express package from an express image presenting express packages. The target express package may be an express package to be searched or to be located.

Here, the courier usually needs to use the terminal device to shoot a region where express packages (which may be one express package or multiple express packages) are placed, so as to obtain an express image presenting the express package(s). An express is usually delivered in the form of an express package from a sender to a recipient. An express waybill is usually a document presenting express related information, and the express related information may usually include an express waybill number, sender's address information, sender's contact information, recipient's address information, and recipient's contact information. An express package usually corresponds to the express waybill, for example, the express waybill can be affixed to the express package. Usually, the courier needs to standardize the placement of express packages, for example, the express waybills on the express packages are upward, and certain gaps should be reserved between the express packages.

In this embodiment, the express locating request usually includes express information, and the express information may include, but is not limited to: part or all of the mobile phone number of an express recipient (for example, the last four digits of the mobile phone number), and part or all of the express waybill number (for example, the last four digits of the express number).

Step 202: Searching for pre-stored location information of an express waybill corresponding to express information.

In this embodiment, the executing body may search for the pre-stored location information of the express waybill corresponding to the express information. The executing body usually pre-stores a corresponding relationship between express information and location information of an express waybill. The location information of the express waybill may be represented in the form of $\{x, y, w, h\}$. Here, x and y may be respectively an abscissa value and an ordinate value of a preset location (for example, the upper left corner) of the express waybill (usually a rectangular region) under a preset coordinate system, and w and h may be respectively the width and height of the express waybill. It should be noted that the preset coordinate system may be a world coordinate system or a preset express image coordinate system, for example, a coordinate system taking the lower left corner of the express image as an origin of coordinates and two adjacent edges of the express image as an abscissa axis and an ordinate axis respectively.

Step 203: Generating an express locating result image by means of the location information.

In this embodiment, the executing body may generate the express locating result image by means of the location information found in step 202. The express locating result image may include a locating identifier, for example, a locating box or a locating arrow. The locating identifier is used to indicate an express waybill corresponding to the target express package from the express image. The express locating result image may be an image obtained by superimposing the locating identifier on the express image.

Step 204: Outputting the express locating result image.

In this embodiment, the executing body may output the express locating result image generated in step 203. If the executing body is a terminal device, the executing body may present the express locating result image, so that the courier can find the target express package from multiple express packages based on the locating identifier in the express locating result image. If the executing body is a server, the executing body may send the express locating result image to the terminal device of the courier.

In some optional implementation manners of this embodiment, the express image may include a regional express image. The courier may upload the regional express image by clicking an upload icon for uploading the regional express image, so as to identify the express waybill corresponding to the target express package in the regional express image. At this time, the executing body may search for pre-stored location information of an express waybill in the regional express image corresponding to the express information, and then generate an express locating result image by means of the location information, the locating identifier in the express locating result image being used to indicate the express waybill corresponding to the target express package from the regional express image.

In some optional implementation manners of this embodiment, the express image may include a panoramic express image. The courier may upload the panoramic express image by clicking an upload icon for uploading the panoramic express image, so as to identify the express waybill corresponding to the target express package in the panoramic express image. At this time, the executing body may search for pre-stored location information of an express waybill in the panoramic express image corresponding to the express information, and then generate an express locating result image by means of the location information, the locating identifier in the express locating result image being used to indicate the express waybill corresponding to the target express package from the panoramic express image.

Figure 3:
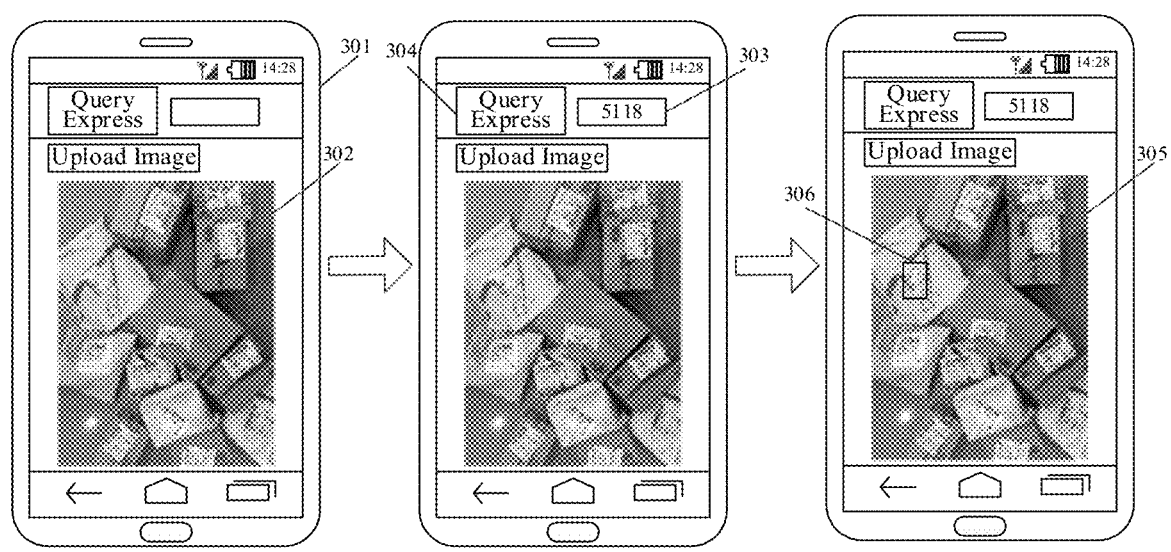
FIG. 3 is a schematic diagram of an application scenario of the method for locating an express package according to the present disclosure.

Continue to refer to FIG. 3. FIG. 3 is a schematic diagram of an application scenario of the method for locating an express package according to this embodiment. In the application scenario of FIG. 3, a courier may use a terminal device 301 to upload an express image 302 presenting express packages. After that, during the process of picking up an express, a user informs the courier of express information (for example, the last four digits of the mobile phone number), and the courier may input the last four digits 5118 of the user's mobile phone number to a query box 303 for querying expresses and click a "Query Express" icon 304. At this time, the terminal device 301 may receive an express locating request for locating an express waybill corresponding to a target express package (an express waybill corresponding to the last four digits 5118 of the mobile phone number) from the express image 302. Next, the terminal device 301 may search for location information of the express waybill corresponding to the last four digits 5118 of the mobile phone number. Then, the terminal device 301 may generate an express locating result image 305 by means of the location information and output the same. The express locating result image 305 usually includes a locating identifier. The locating identifier here is a locating box 306, and the locating box 306 is used to indicate the express waybill corresponding to the target express package from the express image 302. The courier may find the target express package from multiple express packages based on the locating identifier 306 in the express locating result image 305.

According to the method provided by the above embodiment of the present disclosure, after an express locating request for locating an express waybill corresponding to a target express package from an express image is received, location information of the express waybill corresponding to the target express package requested for locating is searched, and then an express locating result image is generated by means of the location information. The courier can quickly and accurately find the customer's express package based on the locating identifier in the express locating result image. This method improves the locating efficiency of express packages, thereby improving the efficiency of express delivery.

Figure 4:
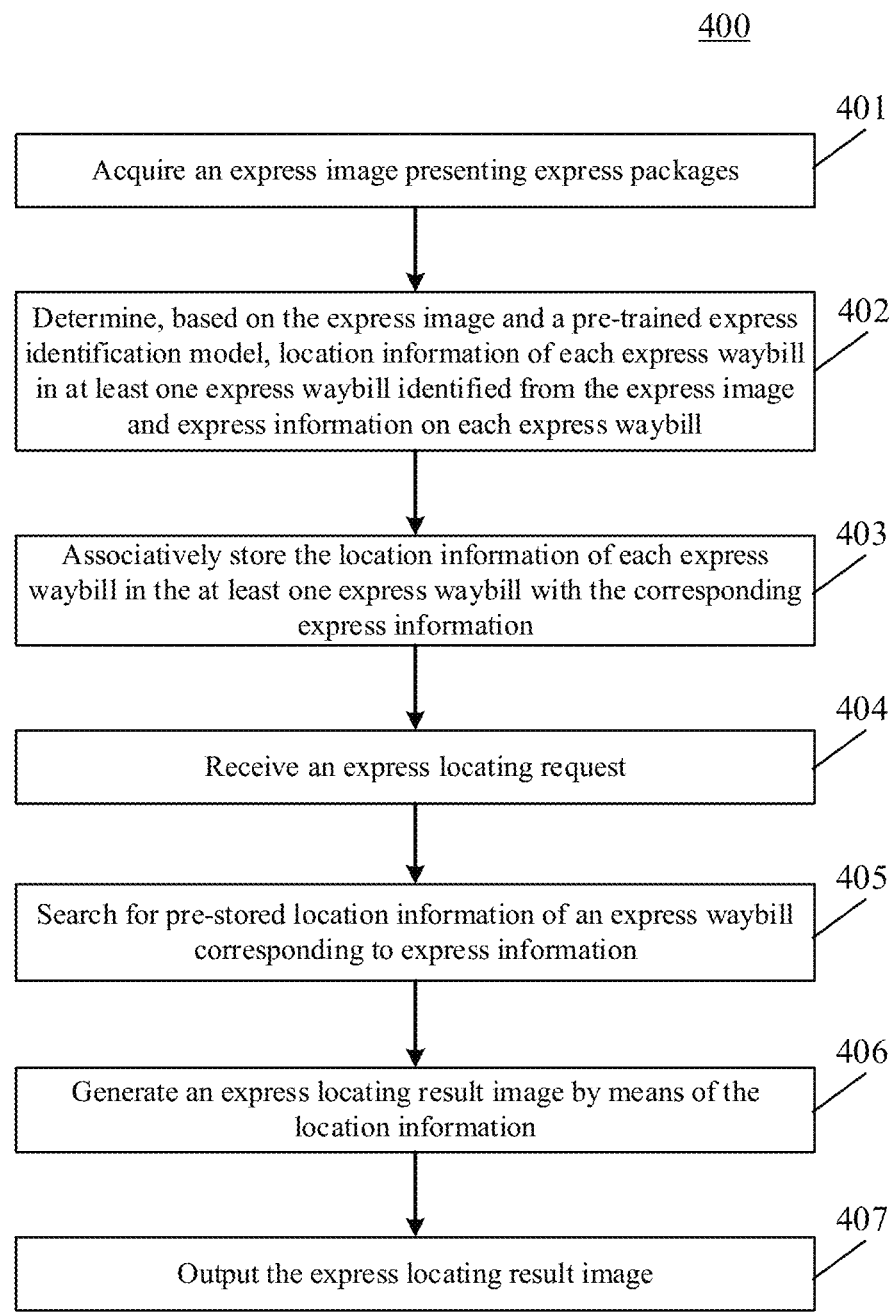
FIG. 4 is a flowchart of the method for locating an express package according to another embodiment of the present disclosure.

With further reference to FIG. 4, a flow 400 of the method for locating an express package according to another embodiment is shown. The flow 400 of the method for locating an express package includes the following steps.

Step 401: Acquiring an express image presenting express packages.

In this embodiment, the executing body (for example, the server or the terminal device shown in FIG. 1) of the method for locating an express package may acquire the express image presenting express packages. If the executing body is a terminal device of a courier, the courier may use the terminal device to shoot a region where express packages are placed, so as to obtain the express image presenting express packages. If the executing body is a server, the server may receive the express image presenting express packages shot by the courier using the terminal device.

Step 402: Determining, based on the express image and a pre-trained express identification model, location information of each express waybill in at least one express waybill identified from the express image and express information on each express waybill.

In this embodiment, the executing body may determine, based on the express image acquired in step 401 and the pre-trained express identification model, the location information of each express waybill in the at least one express waybill identified from the express image and the express information on each express waybill. Specifically, the executing body may input the express image into the express identification model, to obtain the location information of each express waybill in the at least one express waybill identified from the express image and the express information on each express waybill. At this time, the express identification model may be used to represent the image, the location information of the express waybill identified from the image, and the express information on the express waybill.

In this embodiment, the location information of the express waybill may be represented in the form of {x, y, w, h}. Here, x and y may be respectively an abscissa value and an ordinate value of a preset location of the express waybill (usually a rectangular region) under a preset coordinate system, and w and h may be respectively the width and height of the express waybill. It should be noted that the preset coordinate system may be a world coordinate system or a preset express image coordinate system, for example, a coordinate system taking the lower left corner of the express image as an origin of coordinates and two adjacent edges of the express image as an abscissa axis and an ordinate axis respectively. The express information may include, but is not limited to: part or all of the mobile phone number of an express recipient, and part or all of an express waybill number.

Step 403: Associatively storing the location information of each express waybill in the at least one express waybill with the corresponding express information.

In this embodiment, the executing body may associatively store the location information of each express waybill in the at least one express waybill obtained in step 402 with the corresponding express information.

Step 404: Receiving an express locating request.

Step 405: Searching for pre-stored location information of an express waybill corresponding to express information.

Step 406: Generating an express locating result image by means of the location information.

Step 407: Outputting the express locating result image.

In this embodiment, steps 404-407 may be performed in a manner similar to steps 201-204, and details are not described herein again.

In some optional implementation manners of this embodiment, the express image may include a regional express image. The regional express image usually refers to an image obtained by shooting part of a region in which multiple express packages are placed. Therefore, the regional express image usually presents some express packages among all express packages. It should be noted that the regional express image usually presents an express waybill image with a clear front side. The express identification model may include an express detection model, an express location identification model, and an express information identification model. The express detection model may be configured to represent a corresponding relationship between an image and an express waybill region in the image. The express waybill region may be a region including an express waybill, for example, may be a smallest region including an express waybill. The express location identification model may be configured to represent a corresponding relationship between the express waybill region and location information of the express waybill in the express waybill region. The express information identification model may be configured to represent a corresponding relationship between the express waybill region and express information on the express waybill in the express waybill region. The executing body may determine, based on the express image and the pre-trained express identification model, the location information of each express waybill in the at least one express waybill identified from the express image and the express information on each express waybill in the following way: the executing body may first determine an express waybill region in the regional express image based on the regional express image and the express detection model. Specifically, the executing body may input the regional express image into the express detection model, to obtain the express waybill region in the regional express image. The executing body may input the regional express image into the express detection model, to obtain a probability of whether each pixel in the regional express image is of an express waybill region, so as to determine the express waybill region in the regional express image. After that, the executing body may input the express waybill region into the express location identification model, to obtain the location information of each express waybill in the at least one express waybill. Then, the executing body may input the express waybill region into the express information identification model, to obtain the express information on each express waybill in the at least one express waybill.

In some optional implementation manners of this embodiment, the express detection model may include an express waybill detection model and an express package detection model. Here, the express waybill detection model may be configured to represent a corresponding relationship between an image and an initial express waybill region detected from the image and a predicted probability corresponding to the initial express waybill region. The express package detection model may be configured to represent a corresponding relationship between the image and an express package region detected from the image and a predicted probability corresponding to the express package region. The express package region may be a region including an express package, for example, may be a smallest region including an express package.

The executing body may determine the express waybill region in the regional express image based on the regional express image and the express detection model in the following way: the executing body may first input the regional express image into the express waybill detection model, to obtain at least one initial express waybill region detected from the regional express image and a predicted probability corresponding to each initial express waybill region in the at least one initial express waybill region. It should be noted that the initial express waybill region may be represented in the form of {x, y, w, h}. Here, x and y may be respectively an abscissa value and an ordinate value of a preset location of an initial express waybill under a preset coordinate system, and w and h may be respectively the width and height of the initial express waybill.

After that, the executing body may input the regional express image into the express package detection model, to obtain at least one express package region detected from the regional express image and a predicted probability corresponding to each express package region in the at least one express package region. It should be noted that the express package region may also be represented in the form of {x, y, w, h}. Here, x and y may be respectively an abscissa value and an ordinate value of a preset location of an express package under a preset coordinate system, and w and h may be respectively the width and height of the express package. Generally, an initial express waybill region corresponds to an express package region, and the corresponding relationship between the initial express waybill region and the express package region is determined by the relationship between the regional position of the initial express waybill region and the regional position of the express package region. If the initial express waybill region and the express package region overlap at least in part, it can usually indicate that they have a corresponding relationship. Under normal circumstances, the express package region with the corresponding relationship includes the corresponding initial express waybill region. Here, the express package detection model may include a convolutional layer, a pooling layer and a fully connected layer. The regional express image may be input into the convolutional layer of the express package detection model, to perform a convolution operation on pixel features of pixels of the regional express image and a convolution kernel to obtain image features; and then the image features may be input into the pooling layer of the express package detection model, to obtain a pooled feature vector. The features may be extracted by max pooling and average pooling. Finally, the pooled feature vector may be input into the fully connected layer of the express package detection model, so as to classify the pooled feature vector to obtain the express package region and the corresponding predicted probability.

Then, the executing body may determine the express waybill region in the regional express image based on the at least one initial express waybill region, the predicted probability corresponding to each initial express waybill region in the at least one initial express waybill region, the at least one express package region, and the predicted probability corresponding to each express package region in the at least one express package region. Specifically, the executing body may first determine, based on the at least one initial express waybill region and the at least one express package region, multiple sets of corresponding relationships including initial express waybill regions and express package regions. As an example, an initial express waybill region and an express package region that have an overlapping region may be determined as a set of corresponding relationship. Afterwards, for each of the multiple sets of corresponding relationships, a final probability that the initial express waybill region included in the set of corresponding relationship is the express package region in the regional express image may be determined by the following formula (1).

$$P = \begin{cases} \lambda_{bill} P_{bill} + \lambda_{package} P_{package} & \text{if } P_{bill} > 0 \\ 0 & \text{if } P_{bill} = 0 \end{cases} \quad (1)$$

Where, P is the final probability that the initial express waybill region included in the set of corresponding relationship is the express waybill region in the regional express image, $P_{bill}$ is the predicted probability corresponding to the initial express waybill region included in the set of corresponding relationship, $\lambda_{bill}$ is a weight of the predicted probability corresponding to the initial express waybill region included in the set of corresponding relationship, $P_{package}$ is the predicted probability corresponding to the express package region included in the set of corresponding relationship, and $\lambda_{package}$ is a weight of the predicted probability corresponding to the express package region included in the set of corresponding relationship.

Finally, based on the final probability P that the initial express waybill region included in the set of corresponding relationship is the express waybill region in the regional express image, it may be determined whether the initial express waybill region included in the set of corresponding relationship is the express waybill region in the regional express image. Specifically, if the final probability P that the initial express waybill region included in the set of corresponding relationship is the express waybill region in the regional express image is greater than a preset probability threshold (for example, 0.8), it may be determined that the initial express waybill region included in the set of corresponding relationship is the express waybill region in the regional express image.

It can be known from the above formula (1) that, if the predicted probability corresponding to the initial express waybill region included in the set of corresponding relationship is 0, the initial express waybill region included in the set of corresponding relationship must not be the express waybill region in the regional express image. If the predicted probability corresponding to the initial express waybill region included in the set of corresponding relationship is greater than 0, the final probability corresponding to the corresponding initial express waybill may be corrected by means of the predicted probability corresponding to the express package region included in the set of corresponding relationship.

Due to the similar colors between express packages, it is difficult to distinguish the boundaries of express packages, while there are express packages with large differences in color from express waybills. Therefore, express waybills are more easily identified than express packages. The way of determining the express waybill region from the regional express image can be dominated by the identification result of the express waybill, which improves the detection effect of express packages.

In some optional implementation manners of this embodiment, the express image may include a panoramic express image. The panoramic express image usually refers to an image obtained by shooting all of a region in which multiple express packages are placed. Therefore, the panoramic express image usually presents all of the express packages. The express identification model also includes a panoramic identification model. The panoramic identification model may be configured to map the location information of the express waybill in the regional express image to the panoramic express image, so as to determine the location information of a certain express waybill in the regional express image in the panoramic express image. The executing body may determine, based on the express image and the pre-trained express identification model, the location information of each express waybill in the at least one express waybill identified from the express image and the express information on each express waybill in the following way: the executing body may input the regional express image and the panoramic express image into the panoramic identification model, to obtain a corresponding relationship between the location information of the express waybill in the panoramic express image and the location information of the express waybill in the regional express image. Specifically, the executing body may input the regional express image and the panoramic express image into the panoramic identification model, to obtain a distance (for example, a cosine distance, or a Euclidean distance) between a feature vector of a certain express waybill in the regional express image and a feature vector of each express waybill in the panoramic express image. The executing body may select the express waybill corresponding to the feature vector with the shortest distance as the express waybill most similar to the express waybill in the regional express image, and determine the corresponding relationship between the express waybill in the regional express image and the express waybill in the panoramic express image. It should be noted that, in the process of determining the similarity between a certain express waybill in the regional express image and each express waybill in the panoramic express image, each express waybill in the panoramic express image may be traversed by means of a detection box. Afterwards, the corresponding relationship between the location information of the express waybill in the panoramic express image and the location information of the express waybill in the regional express image may be stored. In this way, the partial express image can be combined with the panoramic express image, and the target express package can be located in the panoramic image by identifying the front clear partial image. This method can increase the number of express packages identified at one time, and further improve the search efficiency of express packages.

As can be seen from FIG. 4, compared with the embodiment corresponding to FIG. 2, the flow 400 of the method for locating an express package in this embodiment embodies the steps of determining the corresponding relationship between the location information of the express waybill and the express information on the express waybill, and storing the determined corresponding relationship. Therefore, the solution described in this embodiment can accurately determine the corresponding relationship between the location information of the express waybill and the express information on the express waybill before locating the express package, thereby improving the search efficiency of express packages.

Figure 5:
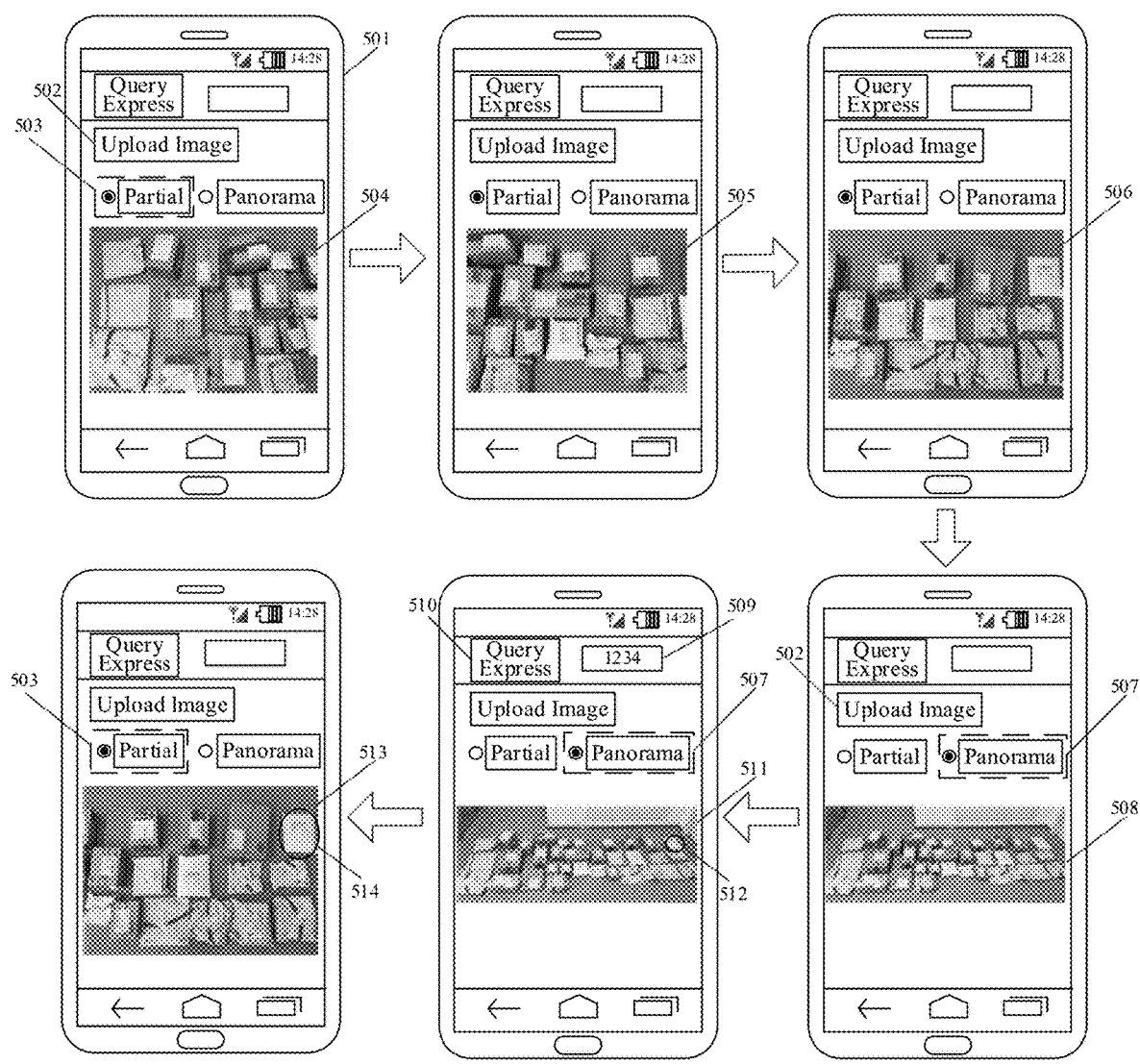
FIG. 5 is a schematic diagram of another application scenario of the method for locating an express package according to the present disclosure.

Continue to refer to FIG. 5. FIG. 5 is a schematic diagram of another application scenario of the method for locating an express package according to this embodiment. In the application scenario of FIG. 5, a courier may use a terminal device 501 to upload an express image presenting at least one express package. Here, the courier may click an "Upload Image" icon 502, and then select a "Partial" option, as shown by an icon 503, to upload a partial express image, where the uploaded partial express image is shown as an icon 504. Next, the courier may upload a partial express image 505 and a partial express image 506 in the same way. Then, the courier may click the "Upload Image" icon 502, and then select a "Panorama" option, as shown by an icon 507, to upload a panoramic express image, where the uploaded panoramic express image is shown as an icon 508. After that, during the process of picking up an express, a user informs the courier of express information (for example, the last four digits of the mobile phone number), and the courier may input the last four digits 1234 of the user's mobile phone number to a query box 509 for querying expresses and click a "Query Express" icon 510. At this time, the terminal device 501 may receive an express locating request for locating an express waybill corresponding to a target express package (an express waybill corresponding to the last four digits 1234 of the mobile phone number) from the partial express images 504, 505, and 506 and the panoramic express image 508. Then, the terminal device 501 may search for pre-stored location information of the express waybill corresponding to the last four digits of the mobile phone number 1234. Here, the location information may include location information of the express waybill corresponding to the target express package on the partial express image and position information of the express waybill corresponding to the target express package on the panoramic express image. Then, the terminal device 501 may generate an express locating result image 511 by means of the location information of the express waybill corresponding to the target express package on the partial express image and output the same. If the courier selects the "Panorama" option, as shown by the icon 507, the terminal device 501 may present the express locating result image 511. Here, the express locating result image 511 includes a locating identifier 512, and the locating identifier 512 is used to indicate the express waybill corresponding to the target express package from the panoramic express image 508. The terminal device 501 may generate an express locating result image 513 by means of the location information of the express waybill corresponding to the target express package on the panoramic express image and output the same. If the courier selects the "Partial" option, as shown by the icon 503, the terminal device 501 may present the express locating result image 513. Here, the express locating result image 513 includes a locating identifier 514, and the locating identifier 514 is used to indicate the express waybill corresponding to the target express package from the partial express image 506. The courier may find the target express package from multiple express packages based on the locating identifier 512 in the express locating result image 511 and the locating identifier 514 in the express locating result image 513.

Figure 6:
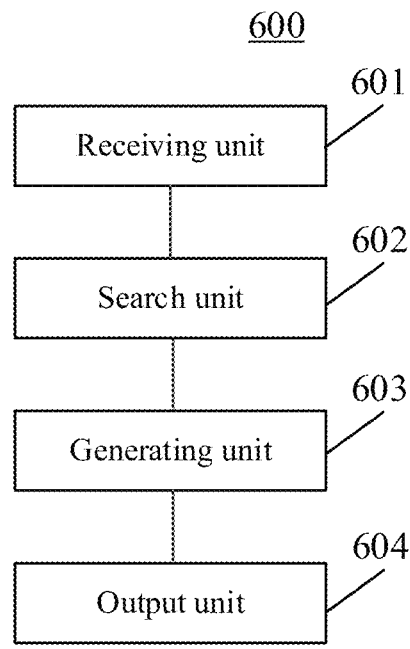
FIG. 6 is a schematic structural diagram of an apparatus for locating an express package according to an embodiment of the present disclosure.

With further reference to FIG. 6, as an implementation of the methods shown in the above-mentioned figures, an embodiment of the present disclosure provides an apparatus for locating an express package. The embodiment of the apparatus corresponds to the embodiment of the method shown in FIG. 2. Specifically, the apparatus may be applied to various electronic devices.

As shown in FIG. 6, the apparatus 600 for locating an express package in this embodiment includes: a receiving unit 601, a search unit 602, a generating unit 603 and an output unit 604. The receiving unit 601 is configured to receive an express locating request, where the express locating request is used to locate an express waybill corresponding to a target express package from an express image presenting express packages, and the express locating request includes express information; the search unit 602 is configured to search for pre-stored location information of the express waybill corresponding to the express information; the generating unit 603 is configured to generate an express locating result image by means of the location information, where the express locating result image includes a locating identifier, and the locating identifier is used to indicate the express waybill corresponding to the target express package from the express image; and the output unit 604 is configured to output the express locating result image.

In this embodiment, for the specific processing of the receiving unit 601, the search unit 602, the generating unit 603 and the output unit 604 of the apparatus 600 for locating an express package, reference may be made to steps 201, 202, 203, and 204 in the corresponding embodiment of FIG. 2.

In some alternative implementation manners of this embodiment, the apparatus 600 for locating an express package may further include an acquisition unit (not shown in the figure), a determination unit (not shown in the figure), and a storage unit (not shown in the figure). The acquisition unit may acquire an express image presenting express packages. The determination unit may determine, based on the acquired express image and a pre-trained express identification model, location information of each express waybill in at least one express waybill identified from the express image and express information on each express waybill. Specifically, the determination unit may input the express image into the express identification model, to obtain the location information of each express waybill in the at least one express waybill identified from the express image and the express information on each express waybill. At this time, the express identification model may be used to represent the image, the location information of the express waybill identified from the image, and the express information on the express waybill. The location information of the express waybill may be represented in the form of $\{x, y, w, h\}$. Here, x and y may be respectively an abscissa value and an ordinate value of a preset location of the express waybill (usually a rectangular region) under a preset coordinate system, and w and h may be respectively the width and height of the express waybill. The express information may include, but is not limited to: part or all of the mobile phone number of an express recipient, and part or all of an express waybill number. The storage unit may associatively store the location information of each express waybill in the at least one express waybill with the corresponding express information.

In some alternative implementation manners of this embodiment, the express image may include a regional express image. The regional express image usually refers to an image obtained by shooting part of a region in which multiple express packages are placed. Therefore, the regional express image usually presents some express packages among all express packages. It should be noted that the regional express image usually presents an express waybill image with a clear front side. The express identification model may include an express detection model, an express location identification model, and an express information identification model. The express detection model may be configured to represent a corresponding relationship between an image and an express waybill region in the image. The express waybill region may be a region including an express waybill, for example, may be a smallest region including an express waybill. The express location identification model may be configured to represent a corresponding relationship between the express waybill region and location information of the express waybill in the express waybill region. The express information identification model may be configured to represent a corresponding relationship between the express waybill region and express information on the express waybill in the express waybill region. The determination unit may determine, based on the express image and the pre-trained express identification model, the location information of each express waybill in the at least one express waybill identified from the express image and the express information on each express waybill in the following way: the determination unit may first determine an express waybill region in the regional express image based on the regional express image and the express detection model. Specifically, the determination unit may input the regional express image into the express detection model, to obtain the express waybill region in the regional express image. The determination unit may input the regional express image into the express detection model, to obtain a probability of whether each pixel in the regional express image is of an express waybill region, so as to determine the express waybill region in the regional express image. After that, the determination unit may input the express waybill region into the express location identification model, to obtain the location information of each express waybill in the at least one express waybill. Then, the determination unit may input the express waybill region into the express information identification model, to obtain the express information on each express waybill in the at least one express waybill.

In some alternative implementation manners of this embodiment, the express detection model may include an express waybill detection model and an express package detection model. Here, the express waybill detection model may be configured to represent a corresponding relationship between an image and an initial express waybill region detected from the image and a predicted probability corresponding to the initial express waybill region. The express package detection model may be configured to represent a corresponding relationship between the image and an express package region detected from the image and a predicted probability corresponding to the express package region. The express package region may be a region including an express package, for example, may be a smallest region including an express package.

The determination unit may determine the express waybill region in the regional express image based on the regional express image and the express detection model in the following way: the determination unit may first input the regional express image into the express waybill detection model, to obtain at least one initial express waybill region detected from the regional express image and a predicted probability corresponding to each initial express waybill region in the at least one initial express waybill region. It should be noted that the initial express waybill region may be represented in the form of {x, y, w, h}. Here, x and y may be respectively an abscissa value and an ordinate value of a preset location of an initial express waybill under a preset coordinate system, and w and h may be respectively the width and height of the initial express waybill.

After that, the regional express image may be input into the express package detection model, to obtain at least one express package region detected from the regional express image and a predicted probability corresponding to each express package region in the at least one express package region. It should be noted that the express package region may also be represented in the form of {x, y, w, h}. Here, x and y may be respectively an abscissa value and an ordinate value of a preset location of an express package under a preset coordinate system, and w and h may be respectively the width and height of the express package. Generally, an initial express waybill region corresponds to an express package region, and the corresponding relationship between the initial express waybill region and the express package region is determined by the relationship between the regional position of the initial express waybill region and the regional position of the express package region. If the initial express waybill region and the express package region overlap at least in part, it can usually indicate that they have a corresponding relationship. Under normal circumstances, the express package region with the corresponding relationship includes the corresponding initial express waybill region. Here, the express package detection model may include a convolutional layer, a pooling layer and a fully connected layer. The regional express image may be input into the convolutional layer of the express package detection model, to perform a convolution operation on pixel features of pixels of the regional express image and a convolution kernel to obtain image features; and then the image features may be input into the pooling layer of the express package detection model, to obtain a pooled feature vector. The features may be extracted by max pooling and average pooling. Finally, the pooled feature vector may be input into the fully connected layer of the express package detection model, so as to classify the pooled feature vector to obtain the express package region and the corresponding predicted probability.

Then, the express waybill region in the regional express image may be determined based on the at least one initial express waybill region, the predicted probability corresponding to each initial express waybill region in the at least one initial express waybill region, the at least one express package region, and the predicted probability corresponding to each express package region in the at least one express package region. Specifically, the determination unit may first determine, based on the at least one initial express waybill region and the at least one express package region, multiple sets of corresponding relationships including initial express waybill regions and express package regions. As an example, an initial express waybill region and an express package region that have an overlapping region may be determined as a set of corresponding relationship. Afterwards, for each of the multiple sets of corresponding relationships, a final probability that the initial express waybill region included in the set of corresponding relationship is the express package region in the regional express image may be determined by the following formula (1):

$$P = \begin{cases} \lambda_{bill}P_{bill} + \lambda_{package}P_{package} & \text{if } P_{bill} > 0 \\ 0 & \text{if } P_{bill} = 0 \end{cases} \quad (1)$$

Where, P is the final probability that the initial express waybill region included in the set of corresponding relationship is the express waybill region in the regional express image, $P_{bill}$ is the predicted probability corresponding to the initial express waybill region included in the set of corresponding relationship, $\lambda_{bill}$ is a weight of the predicted probability corresponding to the initial express waybill region included in the set of corresponding relationship, $P_{package}$ is the predicted probability corresponding to the express package region included in the set of corresponding relationship, and $\lambda_{package}$ is a weight of the predicted probability corresponding to the express package region included in the set of corresponding relationship.

Finally, based on the final probability P that the initial express waybill region included in the set of corresponding relationship is the express waybill region in the regional express image, it may be determined whether the initial express waybill region included in the set of corresponding relationship is the express waybill region in the regional express image. Specifically, if the final probability P that the initial express waybill region included in the set of corresponding relationship is the express waybill region in the regional express image is greater than a preset probability threshold, it may be determined that the initial express waybill region included in the set of corresponding relationship is the express waybill region in the regional express image.

It can be known from the above formula (1) that, if the predicted probability corresponding to the initial express waybill region included in the set of corresponding relationship is 0, the initial express waybill region included in the set of corresponding relationship must not be the express waybill region in the regional express image. If the predicted probability corresponding to the initial express waybill region included in the set of corresponding relationship is greater than 0, the final probability corresponding to the corresponding initial express waybill may be corrected by means of the predicted probability corresponding to the express package region included in the set of corresponding relationship.

Due to the similar colors between express packages, it is difficult to distinguish the boundaries of express packages, while there are express packages with large differences in color from express waybills. Therefore, express waybills are more easily identified than express packages. The way of determining the express waybill region from the regional express image can be dominated by the identification result of the express waybill, which improves the detection effect of express packages.

In some alternative implementation manners of this embodiment, the express image may include a panoramic express image. The panoramic express image usually refers to an image obtained by shooting all of a region in which multiple express packages are placed. Therefore, the panoramic express image usually presents all of the express packages. The express identification model also includes a panoramic identification model. The panoramic identification model may be configured to map the location information of the express waybill in the regional express image to the panoramic express image, so as to determine the location information of a certain express waybill in the regional express image in the panoramic express image. The determination unit may determine, based on the express image and the pre-trained express identification model, the location information of each express waybill in the at least one express waybill identified from the express image and the express information on each express waybill in the following way: the determination unit may input the regional express image and the panoramic express image into the panoramic identification model, to obtain a corresponding relationship between the location information of the express waybill in the panoramic express image and the location information of the express waybill in the regional express image. Specifically, the determination unit may input the regional express image and the panoramic express image into the panoramic identification model, to obtain a distance between a feature vector of a certain express waybill in the regional express image and a feature vector of each express waybill in the panoramic express image. The determination unit may select the express waybill corresponding to the feature vector with the shortest distance as the express waybill most similar to the express waybill in the regional express image, and determine the corresponding relationship between the express waybill in the regional express image and the express waybill in the panoramic express image. It should be noted that, in the process of determining the similarity between a certain express waybill in the regional express image and each express waybill in the panoramic express image, each express waybill in the panoramic express image may be traversed by means of a detection box. Afterwards, the corresponding relationship between the location information of the express waybill in the panoramic express image and the location information of the express waybill in the regional express image may be stored. In this way, the partial express image can be combined with the panoramic express image, and the target express package can be located in the panoramic image by identifying the front clear partial image. This method can increase the number of express packages identified at one time, and further improve the search efficiency of express packages.

Hereinafter, refer to FIG. 7, which illustrates a schematic structural diagram of an electronic device (for example, the server or terminal device in FIG. 1) 700 suitable for implementing embodiments of the present disclosure. The electronic device shown in FIG. 7 is merely an example, and should not limit the function and scope of use of the embodiments of the present disclosure.

Figure 7:
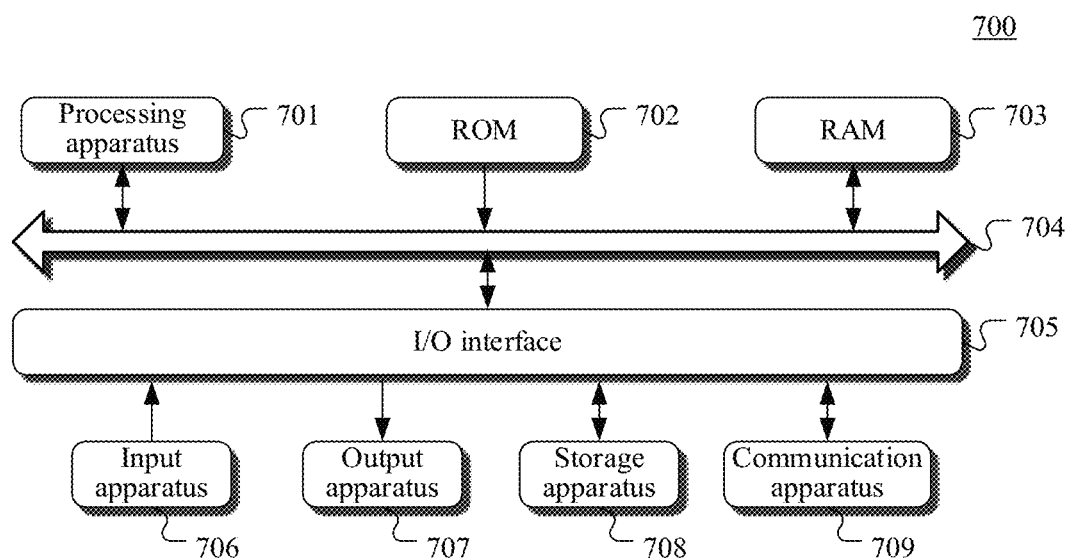
FIG. 7 is a schematic structural diagram of a computer system adapted to implement an electronic device according to embodiments of the present disclosure.

As shown in FIG. 7, the electronic device 700 may include a processing apparatus (e.g., a central processing unit, a graphics processing unit, etc.) 701, which may perform various appropriate operations and processes based on a program stored in a read-only memory (ROM) 702 or a program loaded into a random access memory (RAM) 703 from a storage apparatus 708. The RAM 703 also stores various programs and data required by the operations of the electronic device 700. The processing apparatus 701, the ROM 702, and the RAM 703 are connected to each other by a bus 704. An input/output (I/O) interface 705 is also connected to the bus 704.

Generally, the following apparatuses may be connected to the I/O interface 705: an input apparatus 706 including a touch screen, a touch pad, a keyboard, a mouse, a camera, a microphone, an accelerometer, a gyroscope, etc.; an output apparatus 707 including a liquid crystal display (LCD), a speaker, a vibrator, etc.; and a communication apparatus 709. The communication apparatus 709 may allow wireless or wired communication between the electronic device 700 and other device to exchange data. Although FIG. 7 illustrates the electronic device 700 having various apparatuses, it should be understood that all the illustrated apparatuses are not required to be implemented or included. More or less apparatuses may be alternatively implemented or included. Each block shown in FIG. 7 may represent an apparatus or a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the above-mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: receiving an express locating request, where the express locating request is used to locate an express waybill corresponding to a target express package from an express image presenting express packages, and the express locating request comprises express information; searching for pre-stored location information of the express waybill corresponding to the express information; generating an express locating result image by means of the location information, where the express locating result image includes a locating identifier, and the locating identifier is used to indicate the express waybill corresponding to the target express package from the express image; and A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may alternatively be set in the processor. For example, the units may be described as a processor including a receiving unit, a search unit, a generating unit and an output unit. Here, the names of these units do not in some cases constitute a limitation to such units themselves. For example, the output unit may alternatively be described as "a unit for outputting the express locating result image".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for locating an express package, comprising:
    receiving an express locating request, wherein the express locating request is used to locate an express waybill corresponding to a target express package from an express image presenting express packages, and the express locating request comprises express information;
    searching for pre-stored location information of the express waybill corresponding to the express information;
    generating an express locating result image by means of the location information, wherein the express locating result image comprises a locating identifier, and the locating identifier is used to indicate the express waybill corresponding to the target express package from the express image; and
    outputting the express locating result image.

2. The method according to claim 1, wherein before receiving the express locating request, the method comprises:
    acquiring the express image presenting express packages;
    determining, based on the express image and a pre-trained express identification model, location information of each express waybill in at least one express waybill identified from the express image and express information on each express waybill; and
    associatively storing the location information of each express waybill in the at least one express waybill with the corresponding express information.

3. The method according to claim 2, wherein the express image comprises a regional express image, and the express identification model comprises an express detection model, an express location identification model, and an express information identification model; and
    determining, based on the express image and the pre-trained express identification model, location information of each express waybill in at least one express waybill identified from the express image and express information on each express waybill comprises:
    determining an express waybill region in the regional express image based on the regional express image and the express detection model;
    inputting the express waybill region into the express location identification model, to obtain the location information of each express waybill in the at least one express waybill; and
    inputting the express waybill region into the express information identification model, to obtain the express information on each express waybill in the at least one express waybill.

4. The method according to claim 3, wherein the express detection model comprises an express waybill detection model and an express package detection model; and determining the express waybill region in the regional express image based on the regional express image and the express detection model comprises:

inputting the regional express image into the express waybill detection model, to obtain at least one initial express waybill region detected from the regional express image and a predicted probability corresponding to each initial express waybill region in the at least one initial express waybill region;

inputting the regional express image into the express package detection model, to obtain at least one express package region detected from the regional express image and a predicted probability corresponding to each express package region in the at least one express package region; and determining the express waybill region in the regional express image based on the at least one initial express waybill region, the predicted probability corresponding to each initial express waybill region in the at least one initial express waybill region, the at least one express package region, and the predicted probability corresponding to each express package region in the at least one express package region.

5. The method according to claim 4, wherein the express image comprises a panoramic express image, and the express identification model further comprises a panoramic identification model; and determining, based on the express image and the pre-trained express identification model, location information of each express waybill in at least one express waybill identified from the express image and express information on each express waybill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

6. The method according to claim 3, wherein the express image comprises a panoramic express image, and the express identification model further comprises a panoramic identification model; and determining, based on the express image and the pre-trained express identification model, location information of each express waybill in at least one express waybill identified from the express image and express information on each express waybill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

7. An electronic device, comprising:
one or more processors; and
a storage apparatus, storing one or more programs,
wherein the one or more programs, when executed by the one or more processors, cause the one or more processors to perform operations, comprising:

receiving an express locating request, wherein the express locating request is used to locate an express waybill corresponding to a target express package from an express image presenting express packages, and the express locating request comprises express information:

searching for pre-stored location information of the express waybill corresponding to the express information;

generating an express locating result image by means of the location information, wherein the express locating result image comprises a locating identifier, and the locating identifier is used to indicate the express waybill corresponding to the target express package from the express image; and outputting the express locating result image.

8. The electronic device according to claim 7, wherein before receiving the express locating request, the method comprises:

acquiring the express image presenting express packages;
determining, based on the express image and a pre-trained express identification model, location information of each express waybill in at least one express waybill identified from the express image and express information on each express waybill; and associatively storing the location information of each express waybill in the at least one express way bill with the corresponding express information.

9. The electronic device according to claim 8, wherein the express image comprises a regional express image, and the express identification model comprises an express detection model, an express location identification model, and an express information identification model; and determining, based on the express image and the pre-trained express identification model, location information of each express waybill in at least one express waybill identified from the express image and express information on each express waybill comprises:

determining an express waybill region in the regional express image based on the regional express image and the express detection model;

inputting the express waybill region into the express location identification model, to obtain the location information of each express waybill in the at least one express waybill; and inputting the express waybill region into the express information identification model, to obtain the express information on each express waybill in the at least one express waybill.

10. The electronic device according to claim 9, wherein the express detection model comprises an express waybill detection model and an express package detection model; and determining the express waybill region in the regional express image based on the regional express image and the express detection model comprises:

inputting the regional express image into the express waybill detection model, to obtain at least one initial express waybill region detected from the regional express image and a predicted probability corresponding to each initial express waybill region in the at least one initial express way bill region;

inputting the regional express image into the express package detection model, to obtain at least one express package region detected from the regional express image and a predicted probability corresponding to each express package region in the at least one express package region; and determining the express waybill region in the regional express image based on the at least one initial express waybill region, the predicted probability corresponding to each initial express waybill region in the at least one initial express waybill region, the at least one express package region, and the predicted probability corresponding to each express package region in the at least one express package region.

11. The electronic device according to claim 10, wherein the express image comprises a panoramic express image, and the express identification model further comprises a panoramic identification model; and determining, based on the express image and the pre-trained express identification model, location information of each express waybill in at least one express waybill identified from the express image and express information on each express way bill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

12. The electronic device according to claim 9, wherein the express image comprises a panoramic express image, and the express identification model further comprises a panoramic identification model; and determining, based on the express image and the pre-trained express identification model, location information of each express waybill in at least one express waybill identified from the express image and express information on each express waybill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

13. A non-transitory computer-readable medium storing a computer program, wherein the program when executed by a processor, causes the processor to perform operations, comprising:

receiving an express locating request, wherein the express locating request is used to locate an express waybill corresponding to a target express package from an express image presenting express packages, and the express locating request comprises express information:

searching for pre-stored location information of the express waybill corresponding to the express information;

generating an express locating result image by means of the location information, wherein the express locating result image comprises a locating identifier, and the locating identifier is used to indicate the express waybill corresponding to the target express package from the express image; and outputting the express locating result image.

14. The non-transitory computer-readable medium according to claim 13, wherein before receiving the express locating request, the method comprises:

acquiring the express image presenting express packages;

determining, based on the express image and a pre-trained express identification model, location information of each express waybill in at least one express waybill identified from the express image and express information on each express waybill; and associatively storing the location information of each express waybill in the at least one express waybill with the corresponding express information.

15. The non-transitory computer-readable medium according to claim 14, wherein the express image comprises a regional express image, and the express identification model comprises an express detection model, an express location identification model, and an express information identification model; and determining, based on the express image and the pre-trained express identification model, location information of each express waybill in at least one express waybill identified from the express image and express information on each express way bill comprises:

determining an express waybill region in the regional express image based on the regional express image and the express detection model;

inputting the express waybill region into the express location identification model, to obtain the location information of each express waybill in the at least one express waybill; and inputting the express waybill region into the express information identification model, to obtain the express information on each express waybill in the at least one express waybill.

16. The non-transitory computer-readable medium according to claim 15, wherein the express detection model comprises an express waybill detection model and an express package detection model; and determining the express waybill region in the regional express image based on the regional express image and the express detection model comprises:

inputting the regional express image into the express waybill detection model, to obtain at least one initial express waybill region detected from the regional express image and a predicted probability corresponding to each initial express waybill region in the at least one initial express waybill region;

inputting the regional express image into the express package detection model, to obtain at least one express package region detected from the regional express image and a predicted probability corresponding to each express package region in the at least one express package region; and determining the express waybill region in the regional express image based on the at least one initial express waybill region, the predicted probability corresponding to each initial express waybill region in the at least one initial express waybill region, the at least one express package region, and the predicted probability corresponding to each express package region in the at least one express package region.

17. The non-transitory computer-readable medium according to claim 16, wherein the express image comprises a panoramic express image, and the express identification model further comprises a panoramic identification model; and determining, based on the express image and the pre-trained express identification model, location information of each express waybill in at least one express waybill identified from the express image and express information on each express waybill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

18. The non-transitory computer-readable medium according to claim 15, wherein the express image comprises a panoramic express image, and the express identification model further comprises a panoramic identification model; and determining, based on the express image and the pre-trained express identification model, location information of each express waybill in at least one express waybill identified from the express image and express information on each express waybill comprises:

inputting the regional express image and the panoramic express image into the panoramic identification model, to obtain a corresponding relationship between the location information of the express waybill in the panoramic express image and the location information of the express waybill in the regional express image; and storing the corresponding relationship between the location information of the express waybill in the panoramic express image and the location information of the express waybill in the regional express image.

* * * * *